Patented Nov. 28, 1944

2,363,570

UNITED STATES PATENT OFFICE 2,363,570

IMITATION MOTHER-OF-PEARL

Amerigo F. Caprio, Madison, N. J., assignor, by mesne assignments, to Celanese Corporation of America, a corporation of Delaware No Drawing. Application January 24, 1941, Serial No. 375,765

2 Claims. (Cl. 106—193)

This invention relates to the preparation of decorated plastic materials simulating mother of pearl and to nacreous pigments and artificial pearl essences for making same.

The use of natural fish scales or "guanine" crystals for manufacturing imitation pearl in thermoplastics such as "Celluloid" and "Lumarith" is well known. However, these scales are quite expensive since a complicated and costly process is involved for their preparation in a pure and utilizable form. Owing to their organic composition, fish scales do not withstand very high temperatures such as are sometimes encountered or desired, for example, in injection molding of plastics. If excessive heat, say over 350° F., is employed in molding, these delicate scales undergo decomposition or carbonization, thereby rendering useless their function as a nacreous or mother of pearl pigment. Some plastics such as those made of casein and phenolic resins involve the use of strong chemicals such as ammonia, formaldehyde, carbolic acid, etc. which have a decomposing and destructive action on guanine, particularly when high heat is applied.

Attempts have been made to replace fish scales with finely powdered metals or bronzes, such as aluminum, but these in general fail to produce the delicate, silky, diffused, white sheen effect of the natural fish scales, with the result that metallic powders are used today only in inferior grades of imitation pearl.

Attempts have likewise been made to substitute for guanine certain heavy metallic salts, such as mercurous chloride, lead iodide, bismuth chlorides, etc., but these have similarly failed to meet the numerous requirements essential for a good pearl pigment, such as resistance to heat and certain indispensable chemicals. For example, the nacreous or silky variety of mercurous chloride cannot be employed for making casein or cast phenolic plastics in imitation of mother of pearl, since this metallic salt is rapidly reduced and blackened by chemicals such as ammonia and formaldehyde which enter into the manufacture of such plastics. The toxicity of mercury, lead and other heavy metals also hampers seriously their wider use in plastics or coating compositions, where resistance to certain chemicals or high heat stability may not be of prime importance. Furthermore, the metallic salts hitherto proposed to replace fish scales have not been free of corrosive tendencies which may be explained in some instances by the presence in the molecule of a free hydrogen atom of acid reaction or by hydrolysis and liberation of corrosive halogen constituents in the form of hydrochloric, hydriodic acids, etc. When such pigments are dispersed in lacquer or film solvents or "dope," particularly in the presence of even small quantities of water, marked corrosivity of the metal containers, spraying equipment, extruding nozzles, casting surfaces, etc. can be observed in time. Preservation of color in plastics is also difficult to maintain under these circumstances owing to the destructive acid reaction on the dyes, pigments and bases used. The need for a neutral, stable, non-toxic, nacreous inorganic compound possessing a low solubility or hydrolytic effect in water has been appreciated for a long time, but to date no such substances have been successfully found or proposed.

As already stated, the metallic salts hitherto suggested as pearl substitutes have generally been of a heavy character, comprising metals whose atomic weights are above 100. For example, the atomic weight of mercury is about 200, that of lead 207, while that of bismuth is 209. These salts, owing to their high densities to which their high indices of refraction have been attributed by some investigators in this field, tend to settle out from suspension in lacquers, essences or dopes used for coating or for the making of plastics. To keep the pigments in proper, homogeneous dispersion the essences or media containing them must be frequently stirred during their application to insure uniformity of results.

Another disadvantage of the known pearl substitutes is their tendency to lose their pearliness or luster when the crystals are dried of moisture or other liquid in which they may be suspended.

The object of this invention is the production of a nacreous, silky variety of an inorganic metallic compound which is resistant to the action of alkalies and reducing agents, such as ammonia, sodium hydroxide, soap solutions, formaldehyde, acetone, etc., and which are not blackened or decomposed by such chemicals.

Another object is to produce nacreous mother of pearl substitutes, which are relatively cheap, simple and economical to prepare on a practical scale.

A further object is the production of nacreous pigments difficulty soluble in cold or boiling water as well as in the usual organic solvents, and which are neutral in reaction, i. e., do not give rise to free hydrogen or halogen ions likely to cause corrosion of metals, decomposition of plastic bases, color instability, etc.

Still another object is to extend the scope of artificial pearl pigments in either thermoplastic or thermosetting plastics of diversified character made from various bases such as cellulose nitrate, cellulose acetate, cellulose aceto butyrate, ethyl cellulose, casein, gelatin, proteids, alkyd resins, phenolic condensation resins, polymerization products, synthetic rubber, etc.

Another object is the production of nacreous pigments which are remarkably stable at high temperatures and whose luster-producing property is not destroyed in dry form.

Another object is to produce lustrous, scintillating, light-weight particles of extremely fine size which can be effectively dispersed and made into paste or essence form using various transparent or translucent agglutinating media.

Still another object is to produce a fish scale substitute which does not carbonize or discolor at high temperatures such as are used in molding plastic articles.

A further object is the production of suitable pearl essences and pastes containing such nacreous pigments in suspension adapted for use in the preparation of plastic sheets, films, foils, molding compositions, powders, lacquer coatings, varnishes, paints, etc.

A further object is the production of decorated plastics of diversified composition containing such nacreous pigments in amounts to impart desirable mother of pearl effects.

Other objects of the invention will appear from the following detailed description.

The above enumerated objectives are realized by the employment of certain double or complex salts of metals whose atomic weights are less than 100 such as manganese, zinc, etc. and in which the metals are in chemical combination with ammonium and phosphate radicals, as, for example, manganous ammonium phosphate, $$MnNH_4PO_4.H_2O$$

This chemical compound, it will be observed, has no free "acid" hydrogen atom nor any halogen constituents likely to cause corrosion. On the contrary, it is a fully neutralized salt containing an ammonium or basic radical in association with the metal. These double or complex metal salts may be produced in highly crystalline and nacreous form, difficultly soluble in water and quite stable to temperatures commonly employed in the making of plastic articles of commerce.

An effective silky precipitate, as already suggested, is manganous ammonium phosphate which can be prepared in a number of ways involving the interaction of various manganese salts and phosphoric acid or salts thereof in the presence of ammonia, with or without modifying agents such as ammonium salts, gelatinizing compounds, wetting agents, etc. Such precipitations may be effected at low as well as at elevated temperatures.

A suitable method for preparing the silky precipitate of manganous ammonium phosphate is by the addition of "micro-cosmic" salt, i. e., sodium ammonium hydrogen phosphate, to manganous chloride in the presence of an alkaline medium such as ammonium hydroxide.

The chemical reaction may be represented as follows:

$$MnCl_2.4H_2O + NaNH_4HPO_4.4H_2O + NH_4OH = \\ MnNH_4PO_4.H_2O + NaCl + NH_4Cl + 4H_2O$$

The manganous ammonium phosphate precipitate first formed is amorphous in appearance. This slowly changes upon standing, with or without agitation or application of heat, into a crystalline, pearly or silky variety. The scales may be purified by washing with water and incorporated in the required media as is well known in the art of making synthetic pearl essences.

There are a number of factors to consider in the preparation of these silky scales, such as:

a. Relative concentration of salts in solution
b. Alkalinity or hydrogen ion concentration of of the solution before and after precipitation
c. Temperature
d. Agitation
e. Addition of other reagents to modify crystal size, improve silkiness, retard or prevent undesirable reactions, etc.
f. Presence or absence of air (oxygen) in the reaction mixture
g. Order or sequence of adding reagents
h. Washing of the precipitated compound
i. Suspension of the scales in appropriate media.

In the chemical reaction represented above care should be taken to avoid or minimize undesirable color reactions between the manganese salt and the ammonium hydroxide since these two chemicals react together to form manganese hydroxide which rapidly oxidizes in the presence of air or oxygen turning into manganese oxides of a brownish or pinkish tint which effects the color purity of the desired silky precipitate. While the nacreous luster of the precipitated phosphate particles is not diminished, it may be desired in some cases to control this side reaction to minimize coloration in the final product. There are various ways in which this can be done, such as, for example, 1. By boiling the water used in the reaction and that used in dissolving the salts so as to expel the dissolved air or oxygen,
2. By carrying out the reaction in a vacuum or inert gas to exclude oxygen,
3. By avoiding an excess of ammonia which is directly responsible for the formation of the manganese hydroxide,
4. By regulating the order of adding reagents, or
5. By using ammonium chloride in whose aqueous solution the precipitated manganese hydroxide is soluble.

By observance of a number of these factors the appearance of the silky precipitated manganous ammonium phosphate may be controlled with the color ranging from a pinkish tint, which may nevertheless be highly desirable, to a white or a substantially colorless form. It is to be understood that no limitation is intended as to the color of the final precipitate. In fact dyes or color pigments may be added in the preparation of the pearl-like crystals in order to obtain varied decorative effects.

Besides a high index of refraction the size of the crystals produced has also an important bearing on the degree of pearliness. It is preferable to produce the scales in a very fine condition, i. e., small crystals are preferred to large crystals, although large crystals may be satisfactorily employed, particularly when these crystals become broken in kneading, mixing and extruding operations to which plastics are ordinarily subjected. However, in order to facilitate orientation of the leaf-like scales upon which the luster or light reflecting properties are dependent, as is well known in the art, it is preferable to produce the scales of extremely fine size approaching that of fish scale or guanine crystals which are ordinarily less than 20 microns (.020 mm.) in diameter. The size of the crystals and, indirectly, the luster can be controlled in a number of ways such as by rapid cooling, adding a gelatinizing or modifying agent, such as gelatin, gum arabic, wetting agent etc. to the water solution, dissolving certain salts having a common ion effect such as water-soluble phosphate or manganese salts whose presence retards the growth of the precipitated crystals in accordance with the mass law phenomenon, using concentrated solutions in preference to dilute ones, replacing part of the water by organic solvents such as alcohol, acetone, glycol ethers, etc. It is evidently not feasible to outline all the possible combinations of factors controlling luster, size, color, etc. The examples given below are illustrative of the varying conditions which may be employed in precipitation, but these are in no way to be regarded as limitative in scope.

For the sake of convenience the stock solutions referred to in the examples are prepared and identified as follows:

Stock Solution M

This is a solution of manganese chloride $MnCl_2.4H_2O$ made by dissolving its molecular weight in grams, i. e., 197.9 grams, in one liter of water.

Stock Solution S

This is a solution of sodium ammonium hydrogen phosphate (micro-cosmic salt)

$NaNH_4HPO_4.4H_2O$ made by dissolving the molecular weight in grams of this salt, i. e., 209.14 grams, in one liter of water, applying heat if necessary to effect complete solution.

Stock Solution A

This is strong ammonia water of the usual 28% $NH_3$ strength.

Stock Solution C

This is ammonium chloride solution made by dissolving 200 grams of ammonium chloride ($NH_4Cl$) salt in one liter of water.

The water used in preparing these solutions and that called for in the reaction is preferably distilled, although ordinary undistilled water may be used if extremely high purity of the precipitate is not essential or desired.

The ingredients given in the examples are listed in the order of their addition and where not otherwise designated the reaction may be conducted at room temperature, (say 25° C.).

Example I

| | |
|---|---|
| Water | cc__ 100 |
| Stock solution S | cc__ 10 |
| Stock solution A | cc__ 2 |
| Stock solution M (reagent added last) | cc__ 5 |

The above ingredients are preferably mixed in a stoppered flask. The addition of Stock solution M causes an immediate precipitation, which is amorphous-looking at the start, but which gradually becomes crystalline and silky upon standing and particularly when vigorous agitation is employed. The change from an amorphous to crystalline state generally takes place in less than an hour and sometimes in a few minutes depending on the conditions used. The silky phosphate precipitate is allowed to settle and the supernatant liquor is decanted. Washing the precipitate by successive decantations with water or centrifuging is continued until all soluble impurities are removed as tested by silver nitrate and molybdate reagents and nitric acid.

The water in the final washed scales may be replaced if desired with liquids such as alcohol, acetone, butyl acetate, etc. as is well known in the art of preparing fish scale essence or its substitutes.

The lustrous scales produced according to this procedure have a pale brown or creamy color and are somewhat coarser than the usual fish scales used today. As stated before, the brownish tint may be eliminated or substantially minimized by preventing the oxidation of manganese hydroxide resulting by the interaction of manganese chloride with ammonia by any of the methods hitherto suggested. The scales, even though slightly colored, are quite lustrous and find useful application in plastics such as "Celluloid," "Catalin," "Erinoid," "Lucite," etc.

The addition of ½ cc. of standard soap solution, such as that used in water analysis, enhances the silveriness of the precipitate. The soap solution may be replaced by 1 cc. or more of a ½ percent aqueous solution of "Aerosol OT," a solid wetting agent known chemically as dioctyl ester of sodium sulpho succinate. In place of soap or other wetting agents there may be used 10 cc. of 1% solution of gum arabic in water. All these "modifying agents" appear to improve dispersion by possibly assisting in the breaking up of clusters or agglomerates of crystals into smaller individual ones, thereby increasing the total surface area for light reflection or refraction.

Example II

The procedure is the same as in Example I except that 50 cc. of water are used instead of 100 cc. A light pink precipitate of somewhat smaller crystals results by this method.

It will be noted that in both the above examples an excess of ammonia and sodium ammonium phosphate is employed over the amounts theoretically called for in the chemical equation given above.

Example III

The proportions are:

| | |
|---|---|
| Water | cc__ 50 |
| Stock solution S | cc__ 10 |
| Stock solution M | cc__ 5 |
| Stock solution A | cc__ 2 |

The ingredients and amounts, it will be noted, are the same as in Example II with the exception that the ammonia is added after the addition of the manganese chloride. By following this order only a very faint pinkish color develops, although the crystals do not form as readily as in Example II.

Example IV

| | |
|---|---|
| Water | cc__ 50 |
| Stock solution S | cc__ 20 |
| Stock solution A | cc__ 4 |
| Stock solution M | cc__ 10 |

With increased concentration of salts in solution, the crystals appear smaller. Boiling the solution assists in the breaking up of clusters of crystals as well as hastens their formation.

Example V 100 cc. of water containing 1.7 grams of $MnCl_2.4H_2O$ in solution are placed in a liter laboratory suction flask and vacuum applied. The flask is shaken at three minute intervals for ½ hour, then 2.3 cc. of Stock solution A are added through a separatory funnel taking precautions to exclude air. 4 cc. of Stock solution M, previously heated to boiling, are then introduced in the flask also through a separatory funnel and the reaction mixture is shaken at frequent intervals for ½ hour. The mixture is left under vacuum overnight. A very fine silvery precipitate forms. The silky scales are washed 10 times by decantation with distilled water until the last water wash is free from soluble chloride and phosphate impurities as determined by the usual silver nitrate and molybdate reagent tests. The water wet scales are then washed twice with 100 cc. of methyl alcohol. The slurry of alcohol wet crystals are placed in a vacuum dessicator and concentrated to a strength of 40% dry crystals and 60% alcohol, which paste may be used directly in making casein, "Catalin," etc., pearl plastics.

These crystals may be dried at a temperature of 100° C. for several hours to expel the alcohol. They are quite stable at 100° C. and lose very slightly in weight at 150° C. (300° F.). Even after drying six hours at such high temperatures the crystals can be dispersed in appropriate menstrua with marked lustrous, pearly effect. The retention of the luster producing power of the dried scales is a distinctive quality not characteristic with fish scale or mercurous chloride which lose their luster when dried. This has the much desired advantage that the dried manganese ammonium phosphate scales can be mixed with molding powders in a dry condition. The proper orientation of the scales and development of pearliness in the plastic is accomplished in the finished extruded, cast or molded product.

EXAMPLE VI

| | |
|---|---|
| Water | cc__ 40 |
| Stock solution C | cc__ 10 |
| Stock solution S | cc__ 20 |
| Stock solution A | cc__ 2 |
| Stock solution M | cc__ 10 |

The use of ammonium chloride improves the color of the crystals as previously explained.

EXAMPLE VII

| | |
|---|---|
| Water | cc__ 25 |
| Stock solution S | cc__ 10 |
| Stock solution A | cc__ 2 |
| Stock solution M | cc__ 7.5 |

The water, S and M Stock solutions, may be boiled for about 15 minutes to expel air prior to and after the addition of the ammonia. The resulting crystals have a white appearance.

EXAMPLE VIII

| | |
|---|---|
| Water | cc__ 25 |
| Stock solution M | cc__ 10 |
| Stock solution C | cc__ 20 |
| Stock solution A | cc__ 1 |
| Stock solution S | cc__ 12 |

Very fine almost white, lustrous scales are produced by this method.

EXAMPLE IX

The same amounts are used as in Example VII, except that a vacuum is applied before and after the addition of the reacting salts to exclude air or oxygen. The precipitated crystals have a white silky appearance.

EXAMPLE X

| | |
|---|---|
| Stock solution C | cc__ 100 |
| Stock solution S | cc__ 10 |
| Stock solution A | cc__ 1.5 |
| Stock solution M | cc__ 10 |

This precipitation may be conducted in the cold. The presence of a large amount of ammonium chloride prevents undesirable color reactions.

EXAMPLE XI

| | |
|---|---|
| Water | cc__ 100 |
| Stock solution M | cc__ 25 |
| Stock solution C | cc__ 25 |
| Stock solution A | cc__ 4 |
| Stock solution S | cc__ 25 |

These relative proportions also lead to the formation of substantially colorless, fine scales.

EXAMPLE XII

| | |
|---|---|
| Water | cc__ 50 |
| Stock solution M | cc__ 20 |
| Stock solution C | cc__ 40 |
| Stock solution A | cc__ 2 |
| Stock solution S | cc__ 25 |
| Gum arabic solution (2 grams of gum dissolved in 100 cc. water) | cc__ 30 |

This precipitation may be conducted in the cold (room temperature). The washed crystals have a very pale color which is hardly noticeable when the scales are diluted or dispersed in plastic. The use of gum arabic is optional. It appears to improve silkiness and fineness. A 90% yield of the scales is obtained by this method based on the theoretical quantity calculated from the chemical equation expressed above. Increased yields may be obtained by slightly increasing the amount of ammonia used.

EXAMPLE XIII

The amounts are the same as in preceding example except that 50% of the water is replaced by 95% alcohol. The crystals appear smaller in size.

EXAMPLE XIV

The amounts are the same as in Example XII except that 50% of the water is replaced by "Cellosolve" (monoethyl ether of ethylene glycol). Very fine silky crystals are formed.

It is evident from the above examples that many changes in procedure may be resorted to without departing from the spirit of the invention, that is, the precipitation of a double salt of manganese or other similarly reactive metals in extremely fine lustrous form simulating in appearance and other characteristics natural fish scales or guanine crystals. While the examples given refer specifically to the use of sodium ammonium hydrogen phosphate and manganese chloride, this is done merely to illustrate the reaction and other water-soluble manganese and phosphate salts could be used to bring about the desired precipitation. For example, manganese chloride may be replaced by other manganese salts such as manganese nitrate, manganese sulphate, etc. and instead of sodium ammonium hydrogen phosphate there may be used other phosphate salts such as the mono or disodium hydrogen phosphate, diammonium hydrogen phosphate, etc. with or without the addition of acids such as hydrochloric acid. Phosphoric acid itself may be used. In all cases the reacting liquids are neutralized or rendered alkaline with ammonia preferably in the presence of ammonium chloride which dissolves any colored manganese oxide which may be formed. The reaction may be conducted either in the cold or at boiling temperature preferably with vigorous stirring until the amorphous precipitate first formed becomes silky and pearly in character. If desired, manganese phosphate salts as well as manganese ammonium phosphate may be redissolved in acid and reprecipitated by the addition of ammonia.

Besides manganese, other metallic salts may be precipitated in like manner such as zinc ammonium phosphate, $ZnNH_4PO_4.H_2O$ and magnesium ammonium phosphate, $MgNH_4PO_4.6H_2O$, the precipitation of the zinc salt being conducted preferably in a neutral solution.

The pearl-like scales of manganese ammonium phosphate, in particular, satisfy excellently the numerous objectives enumerated previously. The scales are quite insoluble in water, only about one part of the compound being soluble in 20,000 parts of cold or boiling water. No reducing or harmful reaction ensues when such pearly pigment is incorporated in a variety of plastics. On the other hand, it has been found, particularly in the case of cellulose derivative plastics, that the use of manganous ammonium phosphate tends towards greater stabilization of the plastic in possibly absorbing traces of liberated acids. Upon ignition these double phosphate salts (manganese, zinc and magnesium) are converted into pyrophosphate salts with the liberation of ammonia and water as typified by the following reaction:

$$2MnNH_4PO_4.H_2O = Mn_2P_2O_7 + NH_3 + H_2O$$

The formation of volatile ammonia and water, which amounts to about 24%, is advantageous in the case of plastics such as "Celluloid" where large amounts say 20–50% of such nacreous pigment may be incorporated for imparting a fire retarding effect as well as pearliness.

It is evident also that the pigment may be suspended or dispersed in a variety of media depending on its use or application. These media may comprise water, low or high boiling solvents or liquids, gelatinizing agents such as pyroxylin, cellulose acetate, resins, etc.

A suitable pearl essence for incorporation into cellulose derivative thermoplastics may be made as follows:

| | Parts by weight |
|---|---|
| Silky variety of manganous ammonium phosphate | 1 |
| Cellulose derivative | 1 |
| Suitable liquid or solvent | 8 |

When used in making pearl/cellulose nitrate lacquers or plastics, it is preferable to make an essence containing cellulose nitrate as the gelatinizing or agglutinating agent. The solvent in such a case may be butyl acetate, with or without low boiling solvents such as alcohol, ethyl acetate, acetone, etc. When the essence is used for making pearl/cellulose acetate plastics the preferred gelatinizing agent is cellulose acetate and suitable solvents in this case may be solvents for cellulose acetate, such as methyl cellosolve acetate, ethyl lactate, dioxan, etc. with or without the use of low boiling solvents or diluents such as alcohol, acetone, chlorinated hydrocarbons, etc. In like manner for ethyl cellulose plastics the cellulose derivative used in making the essence may be ethyl cellulose. It is obvious that other agents or effect materials may be added to the essence such as plasticizers, dyes or coloring matter, etc.

For casein plastics a concentrated essence may be made containing approximately 50% of manganous ammonium phosphate scales and 50% of water or alcohol. A casein solution in ammoniacal water may likewise be used in making an essence of the scales for use in casein pearl plastics. A concentrated alcohol or water suspension or paste of the scales may also be effectively used in the preparation of pearl thermosetting phenolic resins such as Catalin, Bakelite, etc. Manganous ammonium phosphate crystals in water paste can also be satisfactorily introduced in rubber latex containing ammonia. Such suspensions would be impossible in the case of mercurous chloride crystals which are rapidly reduced and blackened by ammonia. It is apparent from the foregoing that one skilled in the art of making plastic materials will know what solvents or media to employ in making suitable essences for proper dispersion in the desired decorated plastic.

It is also obvious that the plastics in which these novel pearl scales may be effectively used for producing pearl effects are quite varied. They may be either thermoplastic or thermosetting in character, no limitation being implied by the term "plastic" as this word is used in the claims. Thus, the plastic base may comprise, for example, cellulose esters, single or mixed, such as cellulose nitrate, cellulose acetate, cellulose propionate, cellulose butyrate, cellulose aceto propionate, cellulose aceto butyrate; cellulose ethers, such as ethyl cellulose and benzyl cellulose; phenol-formaldehyde resins, such as "Bakelite," "Catalin"; urea formaldehyde condensation plastics such as "Beetleware," "Plaskon," etc. The vinyl and acrylic acid plastics may likewise be employed such as "Vinylite," "Lucite," "Styrol," "Saran," etc. In addition to these synthetic resins other plastics may be made comprising the following bases: Casein, gelatin, zein, soya bean oil, shellac, synthetic rubbers appearing under various names such as "Pliofilm," "Pliolite," "Koraseal," "Buna," "Tornesite," etc. Obviously these plastics may embody plasticizers and other well known effect materials. The methods for incorporating the scales, their essences or pastes in these various plastics and the attainment of maximum scale orientation such as by casting, flowing, extruding, etc. are well known in the plastic art and require no discussion. Also the amount of scales incorporated in the plastic will obviously vary depending on the degree of luster desired, the refractive index of the plastic, etc., and may range from one part to 10 parts or more of the silky scales (dry basis) to 100 parts of the plastic base, the parts being by weight.

Furthermore, the scales of this invention may be mixed with other nacreous pigments or metallic powders or fluorescent, iridescent or phosphorescent dyes or pigments to produce enhanced optical effects, particularly when "Lucite" (polymerized methyl methacrylate resin) is employed since this plastic has distinct optical properties of its own. If desired other dyes and coloring matter may be added to obtain diverse colored effects. Transparent wrapping tissues made of Cellophane, "Lumarith Protectoid," "Pliofilm," etc. can be given an attractive lustrous sheen finish by incorporating the scales in the "dope" used for the casting, flowing or extruding of the mass into sheet form. Likewise the silky scales of this invention, preferably less than 10 microns in diameter size, may also be dispersed in solutions or dopes used for the making of artificial silk such as "Celanese," viscose, "Vinyon," etc. in which the dope is squirted through spinnerettes. Other applications will become apparent to those skilled in the art of decorating plastics.

It is to be understood that the foregoing detailed description is given merely by way of illustration and that many variations may be made therein without departing from the spirit of my invention.

Having described my invention, what I desire to secure by Letters Patent is:

1. Moldable decorative material exhibiting a mother of pearl effect, comprising a plastic base material, selected from the group consisting of cellulose acetate, casein and phenol formaldehyde and urea formaldehyde resin, having incorporated therein particles of an ammonium phosphate salt of a metal selected from the group consisting of magnesium, manganese and zinc, said salt being crystalline and silky in character.

2. Moldable decorative material exhibiting a mother of pearl effect, comprising a plastic base material, selected from the group consisting of cellulose acetate, casein, and phenol formaldehyde and urea formaldehyde resin, having incorporated therein the crystalline, silk variety of manganous ammonium phosphate.

AMERIGO F. CAPRIO.